United States Patent [19]
Grimm

[11] Patent Number: 5,740,314
[45] Date of Patent: Apr. 14, 1998

[54] IR HEATING LAMP ARRAY WITH REFLECTORS MODIFIED BY REMOVAL OF SEGMENTS THEREOF

[75] Inventor: Robert A. Grimm, Columbus, Ohio

[73] Assignee: Edison Welding Institute, Columbus, Ohio

[21] Appl. No.: 702,746

[22] Filed: Aug. 23, 1996

Related U.S. Application Data

[60] Provisional application No. 60/003,257 Aug. 25, 1995.

[51] Int. Cl.[6] .................................................. F21V 7/00
[52] U.S. Cl. .......................... 392/420; 392/422; 362/241; 219/405
[58] Field of Search .................................. 392/420, 419, 392/411, 414, 415, 422, 408; 362/241, 247, 240, 297, 346; 250/494.1, 495.1; 219/405, 411, 85.12, 85.13; 156/272.2, 275.1

[56] References Cited

U.S. PATENT DOCUMENTS

| | | | |
|---|---|---|---|
| 3,666,907 | 5/1972 | Nugent et al. | 219/85.12 |
| 3,801,773 | 4/1974 | Matsumi | 392/420 |
| 3,879,164 | 4/1975 | Haldopoulos et al. | 432/10 |
| 4,575,608 | 3/1986 | Wictorin et al. | 219/85.13 |
| 4,985,814 | 1/1991 | Lyons | 362/241 |
| 5,113,479 | 5/1992 | Anderson et al. | 392/417 |
| 5,444,814 | 8/1995 | Hofius, Sr. | 392/407 |

FOREIGN PATENT DOCUMENTS

| | | | |
|---|---|---|---|
| 193419 | 11/1957 | Austria | 392/420 |
| 560064 | 2/1958 | Belgium | 362/247 |
| 226749 | 10/1910 | Germany | 362/241 |
| 110028 | 9/1925 | Switzerland | 362/241 |
| 2125 | 4/1910 | United Kingdom | 362/247 |
| 468689 | 7/1937 | United Kingdom | 362/241 |

OTHER PUBLICATIONS

Lever, R.F., "Applying Radiant Heat to Semiconductor Integrated Circuits", IBM Tech. Disclosure, vol. 20, No. 10, Mar. 1978.

*Primary Examiner*—Tu B. Hoang
*Attorney, Agent, or Firm*—Philip J. Pollick

[57] ABSTRACT

Conventional infrared, spot reflector lamps are modified by removing portions of the reflector to form reflector edges and then placing the reflector edges next to each other to form an array of lamps with a wide variety of configurations. The combined lamps are particularly effective when the filaments of each lamp are oriented in the same direction as that of a desired heating line. Maximum energy flux density is achieved by positioning the lamps at a distance of about twice the focal length of the uncut, spot-focused lamps. By removing segments from the reflectors to form edges that define planes that are parallel to or intersect with each other, various shaped reflectors are formed that are used to assemble arrays that provide uniform heating lines of various shapes.

21 Claims, 8 Drawing Sheets

IR HEATING LAMP ARRAY WITH REFLECTORS MODIFIED BY REMOVAL OF SEGMENTS THEREOF

CROSS REFERENCE TO RELATED APPLICATION

This application claims the benefit of U.S. provisional application Ser. No. 60/003,257 filed on Aug. 25, 1995 which is incorporated by reference as if completely written herein.

BACKGROUND

1. Field of the Invention

This invention relates to a heating method and device and more particularly to an assembly of two or more polychromatic, non-coherent, spot-focused energy lamps having reflectors that have been modified and arranged to afford a uniform heating zone having a wide variety of shapes including straight lines, corners, sharp angles and complex curves.

2. Background

It is often necessary to provide a uniform heat zone with a non-uniform shape as, for example, in the welding of plastics having a bond line with a complex shape. In plastics welding, the parts are often of different materials such as in automotive tail-lights (guide lamp assemblies) where one of the parts is transparent or clear to radiation while a second part is radiation absorbing. Other structural problems may also be encountered in the joining of plastics for particular applications. For example, parts such as automotive tail light (guide lamp) assemblies have complex curves and ribs that require welding at distances remote from the surface. Aluminized coatings on the reflectors often are painted on rather than metallized and these painted coatings absorb radiation causing it to bubble. Focused energy is needed to provide the flux densities required in the weld zone while avoiding damage to the rest of the structure. Several methods can be used to accomplish the joining task including either conventional or through-transmission welding but each has its attendant problems.

Curved Calrod type heaters (electric stove elements) can be used in a conventional rather than through-transmission plastic welding. Wavelength selection (temperature) is important and convection must be accommodated since about half the energy dissipated is due to convection.

In through-transmission plastics welding, non-coherent polychromic radiation such as available from an infrared heat lamp, is caused to pass through a radiation transmitting polymer in contact with a radiation absorbing material, e.g., a thermoplastic with a carbon black filler such as found in gray or black polycarbonate. Since the radiation transmitting polymer does not absorb heat, radiation passes through such material with little heating effect. However, on reaching an absorbing material, the absorbing material absorbs the radiation, converts it to heat, and transfers the heat to the transmitting polymer to join the transmitting and absorbing materials. See U.S. application Ser. No. 08/478,505 filed on Jun. 7, 1995, all of which is incorporated herein by reference as if completely written herein, for additional details. Continuous welding using this technique has been demonstrated; however, the welding speed with a single radiation source and one part per positioning unit (robot) may be too slow for many commercial applications.

Laser diodes can be used for through plastic welding. The method is selective and highly focused. However, cooling of the diodes is inefficient and a significant amount of time is needed between laser pulses.

Curved infrared lamps can be built for mild curvatures but parts often have very sharp curvatures. In addition, the light from these lamps is not focused but rather spreads as from a light bulb. As a result, remote weld zones a few centimeters from the light source require very powerful lamps. Stray radiation can be damaging and the process tends to be inefficient.

Focusing reflectors can be built for curved lamps. However, this is a very complex process, particularly for complex curvatures and corners.

To meet these various problems, it is an object of this invention to provide inexpensive, uniform, complex, focused energy patterns using arrangements of two or more conventional spot-focused infrared heating lamps.

SUMMARY

Quite unexpectedly, it has been found that conventional spot reflector lamps can be modified by removing segments of the reflectors and then placing the resulting reflector edges next to each other to form an array of lamps with a wide variety of configurations. The combined lamps are particularly effective when the filaments of each lamp are oriented in the same direction as that of the desired heating line. Maximum energy flux density is achieved by positioning the lamps at a distance of about twice the focal length of the uncut, spot-focused lamps. Segments cut parallel to or at an angle with each other provide a variety of reflector shapes that can be combined to give a uniform heating line of various shapes.

At least two infrared lamps with elongate filaments and having reflectors that focus to a focal point are used in this invention. Segments are removed from the reflectors to leave at least one edge on each reflector. The edges on each reflector are juxtaposed one to the next. That is, the edges of each reflector are placed next to each other. The filaments of the lamps are positioned so that they are substantially parallel to a line passing through the centers of the two lamp bulbs. Such positioning may involve simply rotating the bulb in the reflector, or, if the reflector and bulb do not allow such rotation, location of the segments must be predetermined prior to removal so as to afford such orientation. A work piece, that is, the object with a desired heating line, is placed at a distance of about twice the distance of the focal length of each reflector prior to removal of the reflector segments. A potential difference is then applied to the lamp filaments to produce a uniform heating line at or in the work piece substantially parallel to a line passing through the bulb centers.

Longer heating lines can be formed by adding additional lamps to a two lamp array. To do this, at least two segments are removed from one of the original reflectors. A segment is also removed from a reflector of a third lamp and the two resulting reflector edges are placed next to each other, that is, juxtaposed one to the next to form a resulting array.

If the second segment is removed from a reflector to leave an edge that is parallel to the edge from the removal of the first segment, a linear array of reflector lamps will be achieved. If the second segment is removed from the reflector to leave an edge that defines a plane that intersects with a plane defined by the edge from the removal of the first segment, angular arrays and resulting heating lines are formed. By using various combinations of parallel edge and intersecting edge lamps, a wide variety of heating line shapes can be obtained including straight lines, corners, sharp angles and complex curves. Additional two-edge reflector lamps can be added to the array to extend the length of the heating line.

Although the reflectors can be held in a particular array with a frame, for many applications it is desirable to join the reflector edges to each other using a suitable joining compound such as an acrylic cement or using other joining techniques.

The heating line afforded by these lamp arrays is useful in plastic joining and especially in situations where it is desirable to join an infrared radiation transmitting material to an infrared absorbing material. In such instances, the infrared transmitting material is placed in contact with the infrared absorbing material to form the work piece with the infrared transmitting material placed between the infrared lamp array and the infrared absorbing material. In this arrangement, infrared radiation passes through the radiation transmitting material and is absorbed by the absorbing material to produce sufficient heat to bond the transmitting and absorbing materials together.

Because the infrared radiation from these lamps is polychromatic and non-coherent, some amount of radiation absorption can be expected to take place in the transmitting material. To minimize such unwanted absorption, is has been found useful to provide a radiation filter between the workpiece and the lamp assembly. Although many commercial filters are available for specific radiation wavelengths, it is especially advantageous to use a filter composed of the same material as the work piece transmitting material. Such a filter may be cooled by rotating the filter or directing a cooling air flow onto the filter or both.

The foregoing and other advantages of the invention will become apparent from the following disclosure in which one or more preferred embodiments of the invention are described in detail and illustrated in the accompanying drawings. It is contemplated that variations in procedures, structural features and arrangements and joining of parts may appear to a person skilled in the art without departing from the scope of or sacrificing any of the advantages of the invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 1:
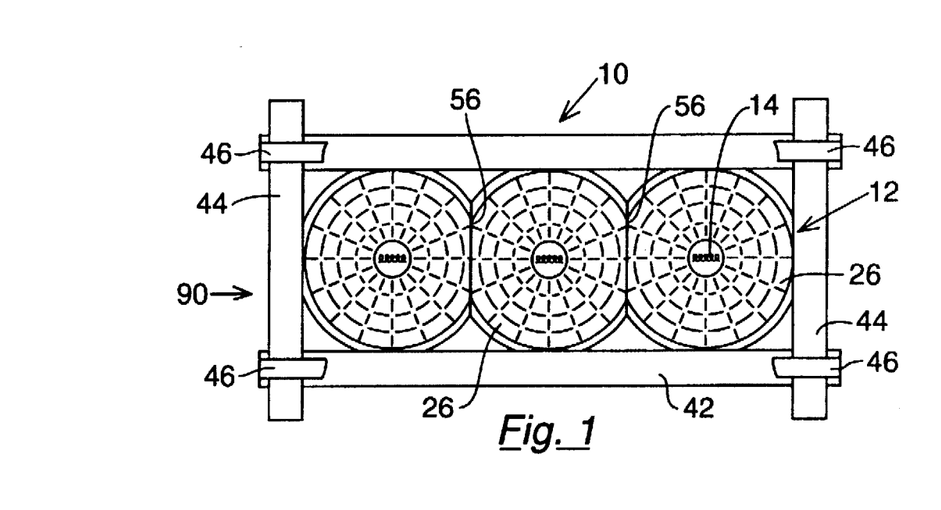
FIG. 1 is a bottom view of a three lamp array according to the present invention.
Figure 2:
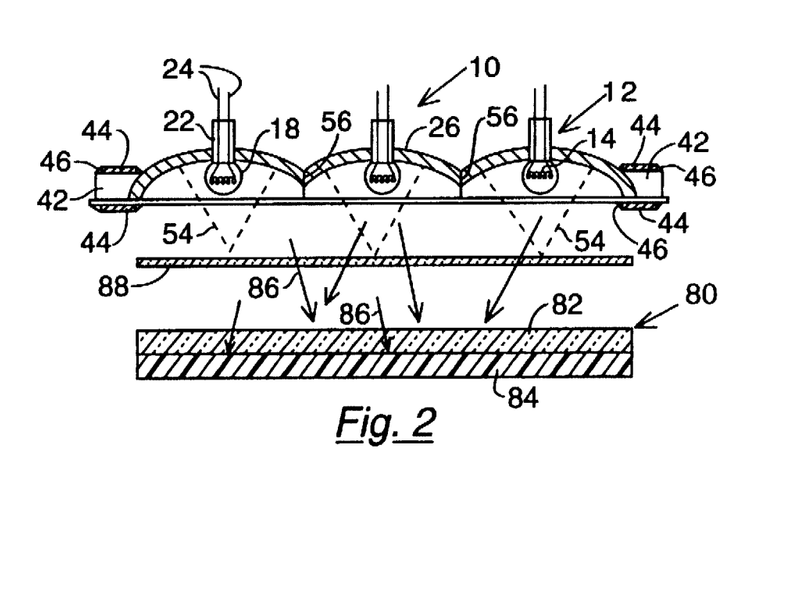
FIG. 2 is a cross-sectional elevational view of the lamp array shown in FIG. 1.
Figure 3:
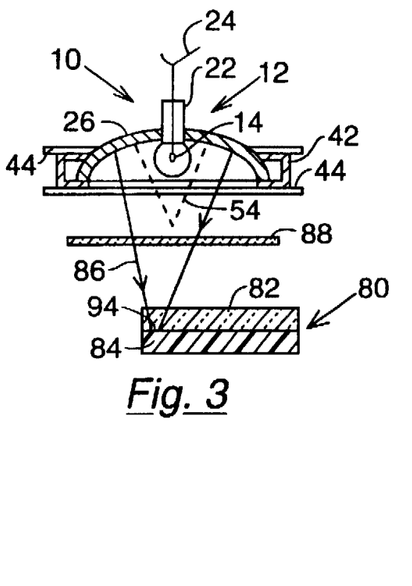
FIG. 3 is a cross-sectional side view of the lamp array shown in FIG. 1.
Figure 4:
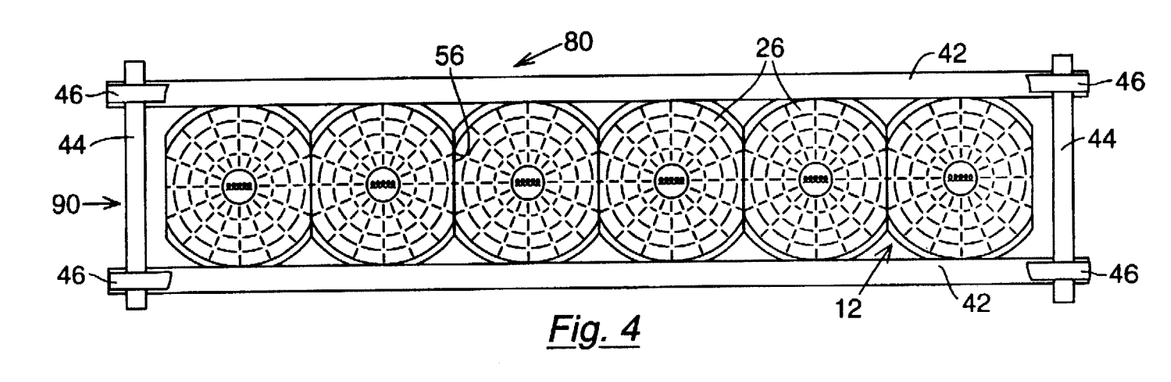
FIG. 4 is a bottom view of another embodiment of the invention showing a linear six lamp array.

A three-lamp linear-line focusing array device is designated generally with the numeral 10 in FIGS. 1–3. More complex arrays are generally designated as 80, 50, 60 and 70 in FIGS. 4–7, respectively. As shown in FIGS. 1–3, device 10 comprises a lamp designated generally as 12 having a filament 14, bulb 18, base 22, electrical connectors 24, and reflector 26.

The lamps 12 used to provide a complex, focused energy pattern, were spot-focused General Electric MR16 Multi-Mirror Reflector Lamps with GX5.3 bases. They are rated at 200 watts at 30 volts and have a color temperature at 3000° K. MR16 lamps have a 5-cm diameter (2 in.) ellipsoidal reflector 26 (focusing) with an uncut focal length of about 1.5 in. (37 mm; shown as dashed line 54 in FIGS. 2 and 3). The filaments 14 in these lamps were a coiled coil about 2 mm in diameter and 4 to 5 mm long.

Lamp reflectors 26 were cut using a water-cooled, diamond wheel. As seen in FIGS. 2 and 3, the long direction of the filament 14 is along (parallel to) the axis of the heated zone (0 degree orientation). The following lamp reflector types were made: Lamps 12 (FIGS. 1–4) were cut so a 6 mm (¼ inch) segment of the reflector 26 was cut from each side. The filament 14 was oriented at 90 degrees to the edge 56 formed by removing the segment. Four lamps 16 were cut so a 12 mm (½ inch) segment was cut from each side to form parallel edges 58 (FIGS. 5 and 7) on reflector 28. The filaments 14 were oriented at 90 degrees to edges 58. Lamps 20 (FIG. 6) were cut into pie-shaped reflectors 22. The acute angle 24 formed by intersecting planes formed by edges 32 was about 60 degrees. The filaments 28 were oriented at 90 degrees to the bisectors of the acute angles 24. FIG. 7 shows a corner array 70 in which lamp 30 was cut so that a right angle 34 was formed by the intersecting planes of edges 36 of the reflector 38. The filament 14 of lamp 30 was at an orientation of 90 degrees to the bisector of the right angle 34. Although not parallel to the heating line, it is to be realized that when the heating line changes directions sharply at a lamp filament, the filament is positioned to be as parallel as possible to the heating line 13, "substantially parallel" to the heating line. Lamp 30 was combined with four parallel edge 25-mm wide lamps 16 (0 degree filament 14) to form a square corner (FIG. 7). Although it is possible to leave the end reflectors intact, i.e., not removing the end sector, it is felt that removal provides a more even energy distribution at the heating line.

The lamps were held in an aluminum frame 90 made from two aluminum bars 42 (1×1×20 cm) that were grooved to receive the edge of the reflectors. The two bars 42 were held together by two thinner strips of aluminum 44 and pieces of pressure sensitive aluminum tape 46. This fixture could be readily adjusted to receive different sized clusters of lamps. It is to be realized that more permanent frame assemblies are typically expected to be used with a particular array and that the construction of such frames is within the purview of those skilled in the art.

The lamps were wired in parallel to a power supply (not shown) using sockets for the lamps. The power supply was Sorenson direct current (DC) Power Supply, Model DCR 150-35A. It was adjusted for 30 volts and was capable of driving 5 lamps (34 A total current). The MR16 lamps work with either alternating current (AC) or DC. Conventional arc welding power supplies can deliver up to 300 amps at 38 volts.

Black paper was used as the workpieces. These were made by making photocopies with the copier cover open. The resulting black surface absorbs radiation from the lamps and melts into a shiny surface as a result of plastic toner materials in the black photocopied sheet.

Lamp radiation exposure was controlled by keeping the black paper covered with a sheet of aluminum foil until the lamp output stabilized, withdrawing it briefly, and then repositioning it over the black surface. Exposure times of one or two seconds normally began to char the paper. If longer times were used, the paper often ignited or smoldered. Plain white paper did not char when exposed, even for times as long as 10 seconds, demonstrating the importance of surface reflectivity.

The lamp array was located at different distances from the black paper by placing spacers under the fixture. Distances between the lip of the reflector and the black paper ranged from 25 to 90 mm.

Heating patterns observed using black photocopied paper were confirmed and measured more quantitatively with arrays of thermocouples embedded in a 6-mm-thick sheets of black polyethylene. Thermocouples were positioned along a strip about 60-mm long.

Lines of focused energy flux that ranged from straight lines to acute angles and curves were demonstrated using modified lamp reflectors initially designed to give a focused spot of energy flux in an unmodified state. Two factors were found important in the modification of the lamp reflectors. One is that the orientation of the filament must be aligned parallel to the desired heating zone. The other is that the lamps must be at a certain distance from the workpiece which is typically about twice the focal length of the spot-focused lamp.

Initial trials with lamps having their filaments perpendicular (90 degrees) to the line of the desired heating zone produced spots. The five lamps, each with a 37-mm (1½ inch) wide reflector, gave char spots on 37-mm centers. On the back side of the paper, melt zones were observed about 12-mm apart.

Lamps with 25-mm wide reflectors and 90-degree filaments also produced spots, but these were on 25-mm centers. On the back side of the paper, melt zones were about 6-mm apart, rather than being joined, as expected. Distances between the lamps and the workpiece were varied, but spots were the only heating pattern produced.

Next, lamps were tried in which the filaments 14 were substantially parallel to the desired heating zone. Two lamps 16 with parallel filaments 14 were made with 25-mm-wide reflectors 28. When heating trials were conducted at reflector-workpiece distances of 25 mm, two distinct spots were observed on 25-mm centers. At a longer distance (approximately 45 mm), the char patterns became slightly dumbbell shaped. At 84 mm, a single, slightly ellipsoidal spot was observed. At the intermediate level of 70 mm, a line-shaped heating (char) pattern about 12×45 mm was observed. A side-by-side comparison was made with three lamps 16 having a filament 14 orientation perpendicular to the weld line. The comparison showed the parallel orientation to be superior, especially at about 70 mm.

Figure 5:
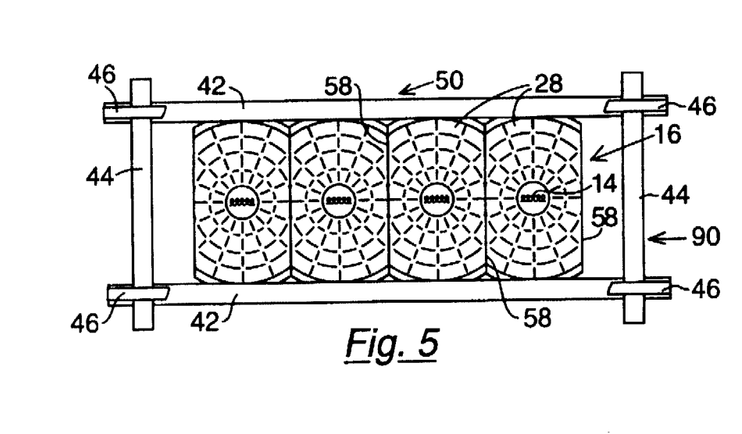
FIG. 5 is a bottom view of another embodiment of the invention showing a linear four lamp array with larger reflective segments removed than in FIG. 4.

When four lamps 16 were used (25 mm wide with a filament orientation parallel to the bond line; FIG. 5), the resulting heating line 94 (FIG. 3) got both wider, about 20 mm, and longer, about 100 mm at a distance of 70 mm.

Lamps with pie-shaped reflectors were glued together (FIG. 6) and examined at several distances from the workpiece. Once again, 70 mm was the found as the optimal distance between the workpiece and the lamp. The pattern was confirmed with a piece of black polyethylene (6-mm thick).

Figure 6:
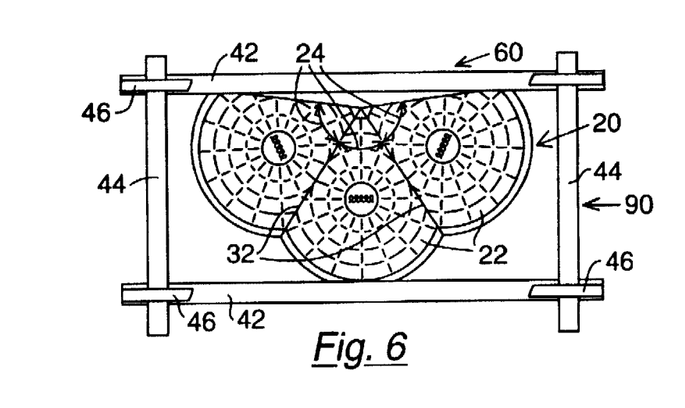
FIG. 6 is a bottom view of another embodiment of the invention illustrating the use of three "pie-shaped" reflectors with each reflector having intersecting reflector edges.
Figure 7:
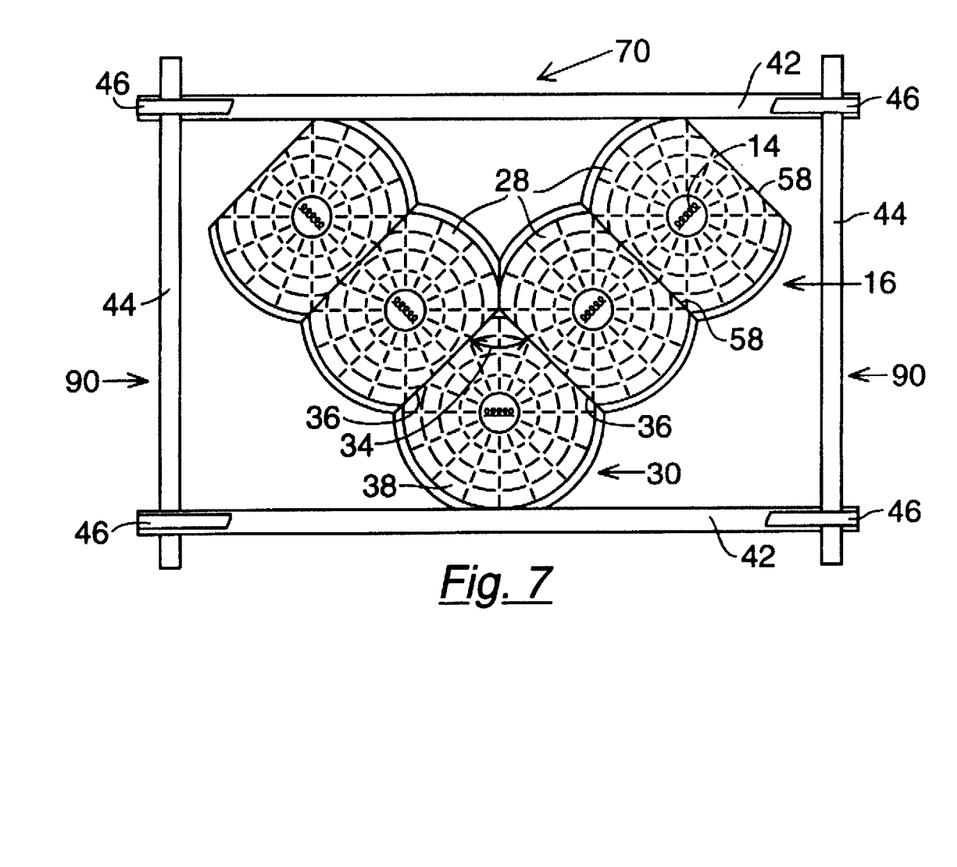
FIG. 7 is a bottom view of a five lamp array with both intersecting and parallel reflector edges used to form a right angle corner.

A corner lamp 30 was glued to the pie-shaped reflector array of FIG. 6 in an attempt to create a curve with a sharp hook (not shown). The corner lamp did not appear to have as high an output as the triangular ones, but a curve with a hook was clearly produced.

The char pattern produced by the corner array of five lamps (two wings of two rectangular lamps each and one corner lamp; FIG. 7) showed clearly that a square corner is possible with heat flux somewhat greater at the corner.

As shown in FIGS. 2 and 3, the work piece 80 can consist of an infrared transmitting material 82 and an infrared absorbing material 84 in contact with each other. Line focused infrared radiation 86 from lamp array 10 passes through the transmitting material 82 to the absorbing material 84 where it is absorbed to produce heat sufficient to join the transmitting and absorbing materials 82 and 84 respectively. A filter 88 my be used between the array and work piece to prevent undue heating of transmitting material 82 and is especially effective when the filter 88 and the transmitting material 82 are composed of substantially the same material.

Figure 8:
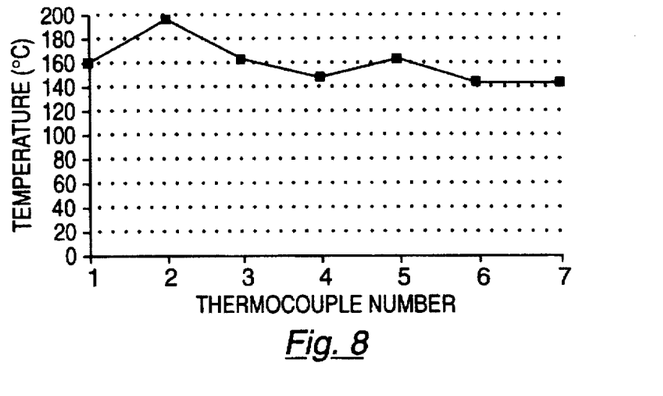
FIG. 8 is a graph of temperature (°C.; vertical axis) and thermocouple number (horizontal axis) of an array of seven thermocouples covered with a sheet of 2.25 mm acrylate placed 60 mm below the linear four lamp array at FIG. 5 after heating for 6 seconds.
Figure 9:
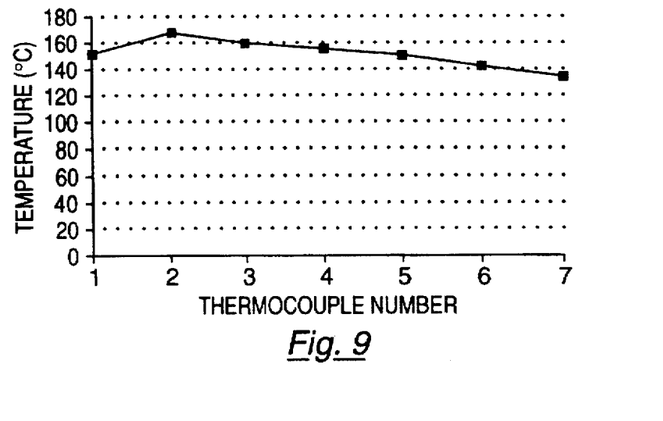
FIG. 9 is a graph of temperature (°C.; vertical axis) and thermocouple number (horizontal axis) similar to that of FIG. 8 but after heating for 7 seconds at a distance of 70 mm below the lamp array.
Figure 10:
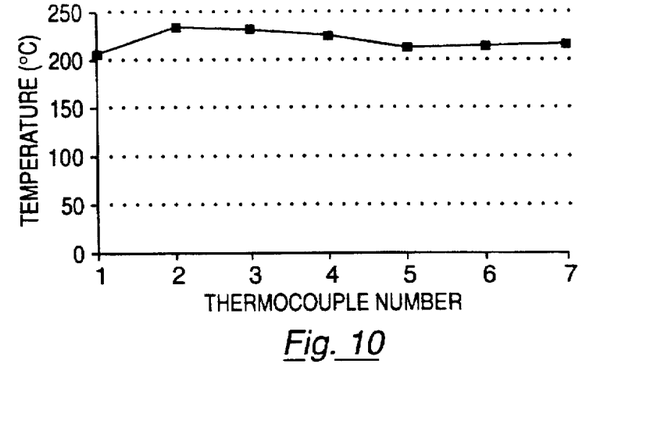
FIG. 10 is a graph of temperature (°C.; vertical axis) and thermocouple number (horizontal axis) similar to that of FIG. 8 but after heating for 10 seconds at a distance of 75 mm below the lamp array.
Figure 11:
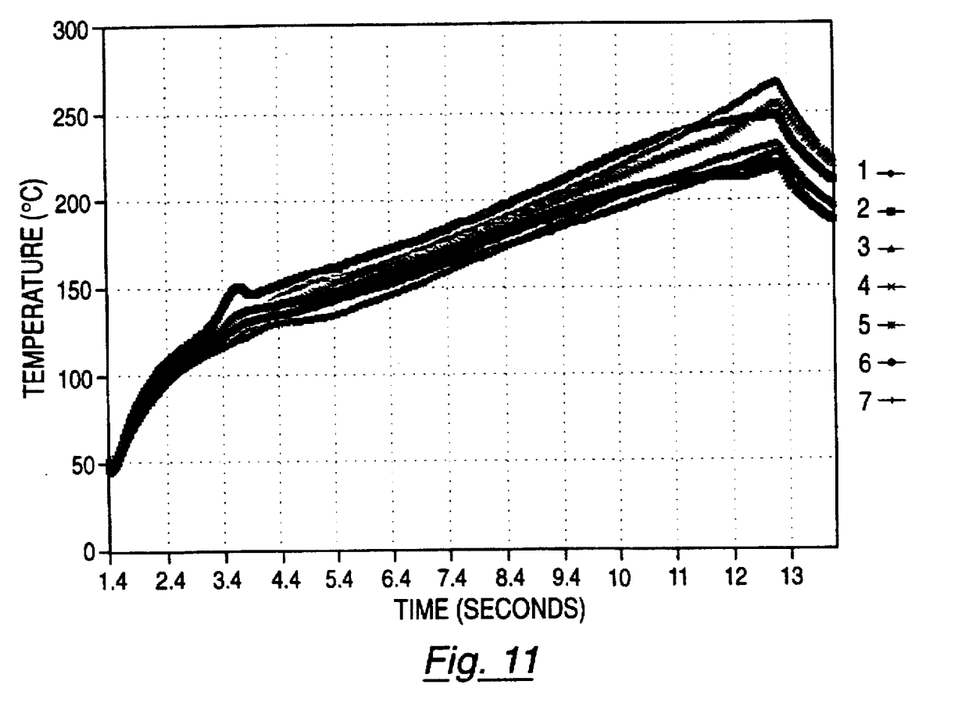
FIG. 11 is a graph of temperature (°C.; vertical axis) versus time (sec; horizontal axis) from each of the seven thermocouples as used in FIG. 10.
Figure 17:
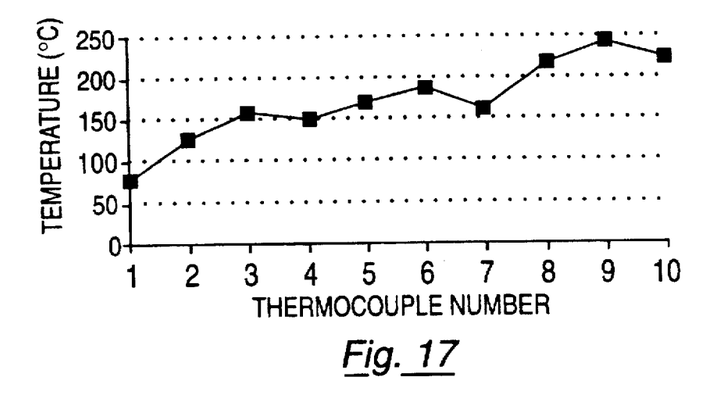
FIG. 17 is a graph of temperature (°C.; vertical axis) and thermocouple number (horizontal axis) similar to that of FIG. 16 but after 5 seconds of heating at 70 mm distance from the lamp array.

FIGS. 8 through 10 show temperature profiles produced by the straight lamp array (FIG. 5) with parallel filaments (four rectangular reflectors with 12 mm cut from each side of the 5 cm diameter reflector) at different distances an array of thermocouples embedded in a sheet of black, 6 mm thick polyethylene arranged along the bond line below the lamps. All profiles were made with a sheet of clear acrylic plastic (2.25 mm thick polymethylmethacrylate) over the thermocouples. While there is some variation in readings, they are remarkably constant considering the pattern is produced by four spot heaters. FIG. 17 shows the heating rate at each thermocouple for the straight array at a distance of 75 mm.

Figure 12:
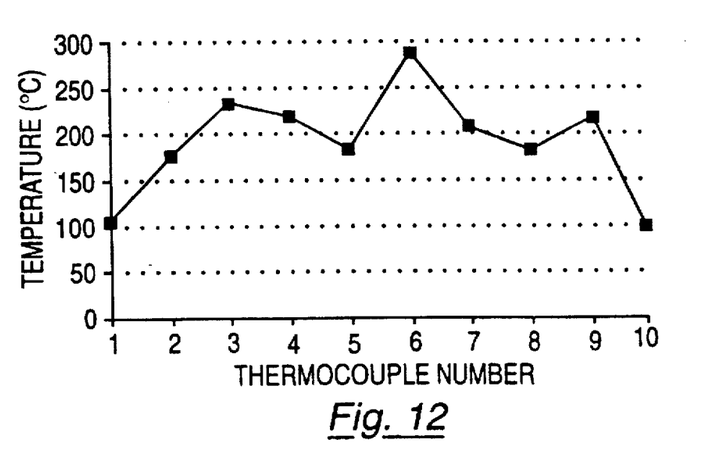
FIG. 12 is a graph of temperature (°C.; vertical axis) and thermocouple number (horizontal axis) of an array of ten thermocouples placed 64 mm below the three triangular lamp arrays of FIG. 6 after 3 seconds of heating without an acrylate sheet thermocouple covering.
Figure 13:
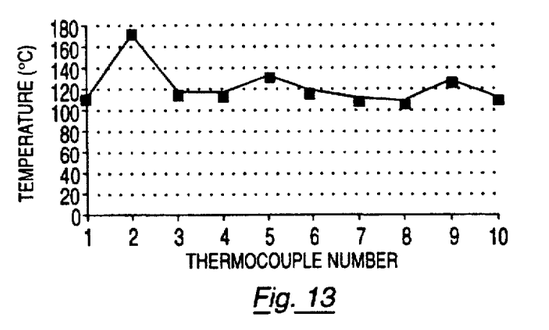
FIG. 13 is a graph of temperature (°C.; vertical axis) and thermocouple number (horizontal axis) similar to that of FIG. 12 but at a distance of 70 mm below the lamp array and having a 2.25 mm acrylate sheet thermocouple covering.
Figure 14:
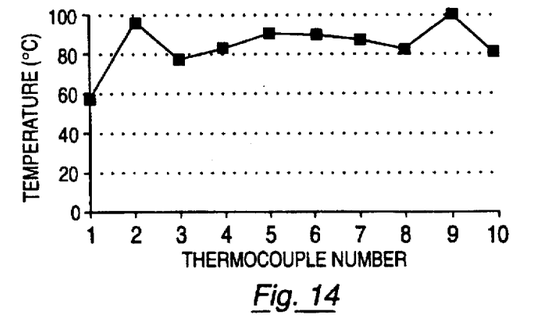
FIG. 14 is a graph of temperature (°C.; vertical axis) and thermocouple number (horizontal axis) similar to that of FIG. 13 after 5 seconds of heating at a distance of 76 mm below the lamp array.

FIGS. 12 through 14 show temperature profiles for the curved array for the three triangular lamps shown in FIG. 6 using an array of ten thermocouples embedded in 6 mm black polyethylene. The test shown in FIG. 12 was made without a sheet of acrylic over the thermocouples while FIGS. 13 and 14 had a sheet of acrylic interposed between the source and the thermocouples.

Figure 15:
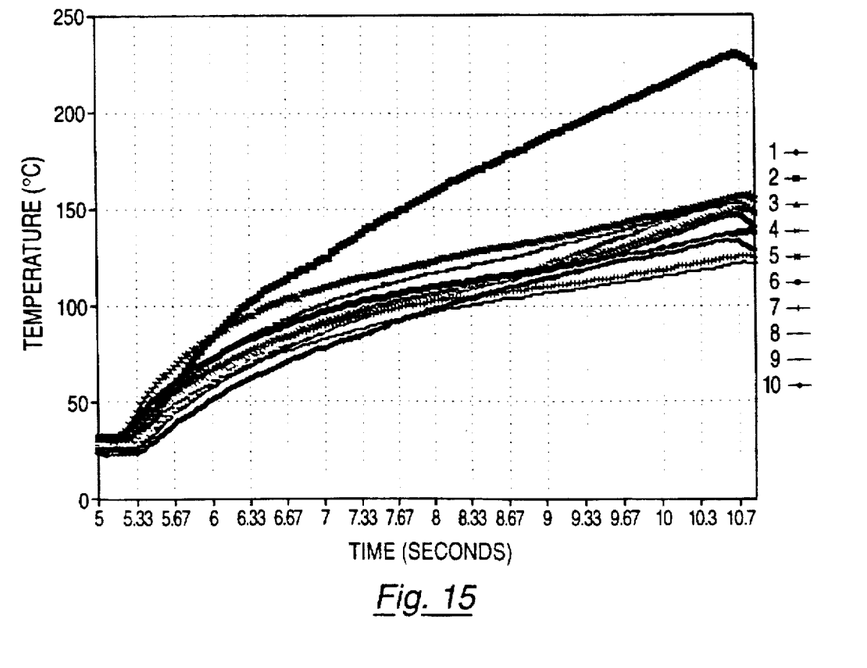
FIG. 15 is a graph of temperature (°C.; vertical axis) versus time (sec; horizontal axis) from each of the ten thermocouples as used in FIGS. 12 through 14 at a distance of 70 mm from the lamp array with a 2.25 mm clear acrylate sheet placed over the thermocouples.

The sheet of acrylic reduced the attained temperatures compared to the case without it. However, the benefit of using the 70 to 76 mm lamp-to-workpiece distance was clear. Temperature variation along the curve was surprisingly small considering the flux was coming from spot heaters. Thermocouple 2 is out of line in FIGS. 13 and 14 which is felt to be due to the difficulty of embedding the thermocouples in the polyethylene. FIG. 15 shows the heating rate for each of the ten thermocouples heated below the curved array at 70 mm with the acrylic sheet in place.

Figure 16:
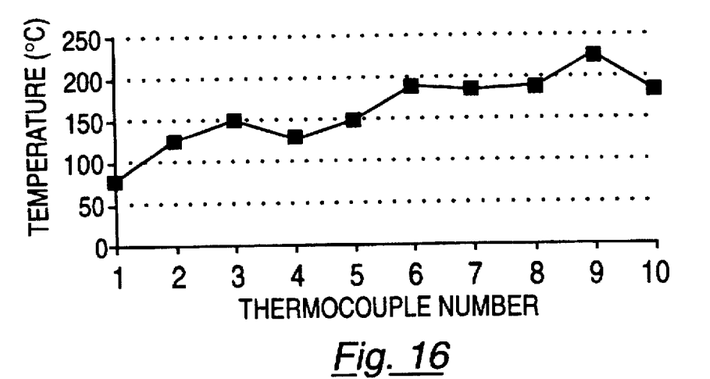
FIG. 16 is a graph of temperature (°C.; vertical axis) and thermocouple position (horizontal axis) of an array of ten thermocouples placed under one leg of the corner shown in FIG. 7 after 3.4 seconds of heating at a 64 mm distance from the lamp array using a 2.25 mm acrylic covering placed over the thermocouples.
Figure 18:
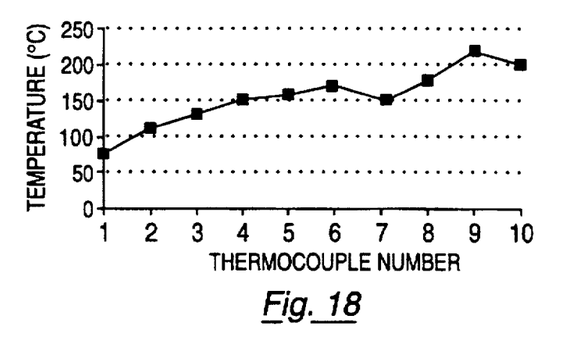
FIG. 18 is a graph of temperature (°C.; vertical axis) and thermocouple number (horizontal axis) similar to that of FIG. 16 but after 5 seconds of heating at a 76 mm distance from the lamp array.
Figure 19:
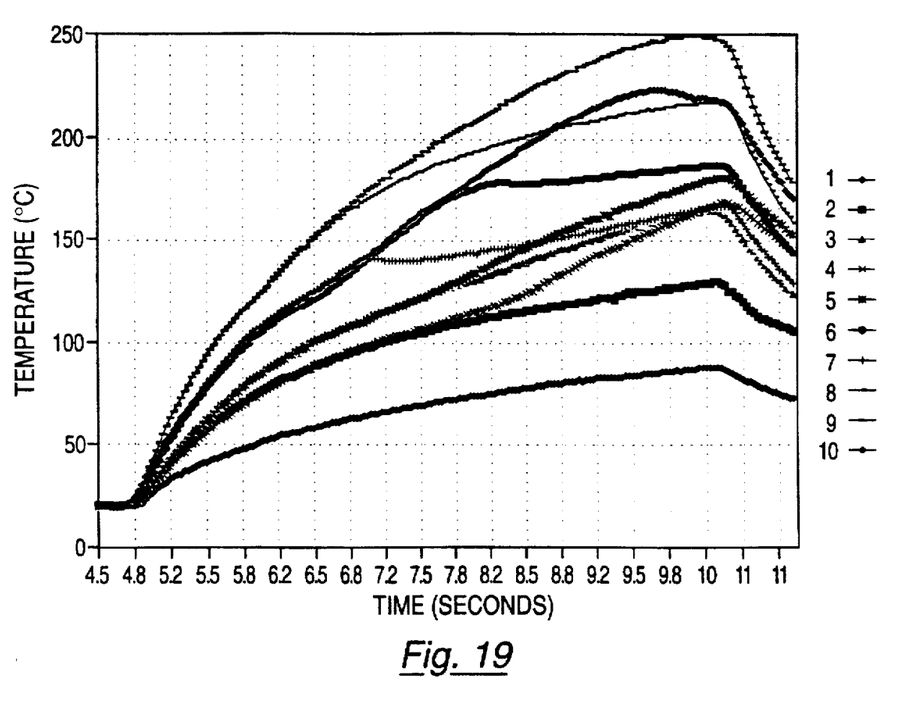
FIG. 19 is a graph of temperature (°C.; vertical axis) versus time (sec; horizontal axis) from each of the ten thermocouples as used in FIG. 17.

FIGS. 16 through 18 show the temperature profiles for one leg of the corner array at FIG. 7 at different distances. Only one leg was measured so that thermocouple spacing was close, providing a more accurate reading. As can be seen, the observed temperatures rise about 125° C. from the end of the leg to the corner, with the corner being hotter. This confirms the qualitative results from the char patterns that also show the corner is hotter than the legs. FIG. 17 shows the temperature increase with heating time for each thermocouple used with this array and the range of temperature found. More uniform heating and temperature profiles can be achieved by varying the lamp voltage, the distance between the lamps (amount of reflector portion removed) or both.

These results show that the lines of electromagnetic flux density can be made to follow straight lines, a curved line, and a corner by trimming various edges from segmented spot lamps to conform the desired flux density shape to the weld zone.

It is possible that changes in configurations to other than those shown could be used but that which is shown if preferred and typical. Without departing from the spirit of this invention, various means of fastening the components together may be used.

It is therefore understood that although the present invention has been specifically disclosed with the preferred embodiment and examples, modifications to the design concerning sizing, shape, positioning and reflector joining (when used) will be apparent to those skilled in the art and such modifications and variations are considered to be equivalent to and within the scope of the disclosed invention and the appended claims.

I claim:

1. A heating method comprising:
   a) providing a first infrared lamp with a first elongate filament and a first reflector with a first focal length focusing to a first focal point;
   b) providing a second infrared lamp with a second elongate filament and a second reflector with a second focal length focusing to a second focal point;
   c) forming a first reflector first edge by removing a segment of said first reflector;
   d) forming a second reflector first edge by removing a segment of said second reflector;
   e) juxtaposing said first reflector first edge with said second reflector first edge one to the next;
   f) positioning said first elongate filament and said second elongate filament substantially parallel to a work piece heating line;
   g) positioning a work piece at a distance of about twice said first focal length from said first infrared lamp and at a distance of about twice said second focal length from said second infrared lamp; and
   h) applying a potential difference to said first filament and said second filament.

2. The heating method according to claim 1 comprising the further steps of:
   a) removing a second segment of said second reflector to form a second reflector second edge;
   b) providing a third infrared lamp with a third elongate filament and a third reflector focusing to a third focal point;
   c) forming a third reflector first edge by removing a segment of said third reflector;
   d) juxtaposing said second reflector second edge with said third reflector first edge one to the next;
   e) positioning said third elongate filament substantially parallel to a work piece heating line; and
   f) applying said potential difference to said third filament simultaneously with said application of said potential difference to said first filament and said second filament.

3. The heating method according to claim 2 wherein said second reflector first segment and said second reflector second segment are removed so that said resulting second reflector first edge and said second reflector second edge are parallel to each other.

4. The heating method according to claim 2 wherein said second reflector first segment and said second reflector second segment are removed so that a plane defined by said second reflector first edge intersects a second plane defined by said second reflector second edge.

5. The heating method according to claim 1 comprising the further step of joining the first reflector first edge to said second reflector first edge.

6. The method according to claim 2 comprising the further step of joining said first reflector first edge to said second reflector first edge and said second reflector second edge to said third reflector first edge.

7. The heating method according to claim 1 comprising the further step of forming said work piece by
   a) providing an infrared light absorbing material; and
   b) providing an infrared transmitting material in contact with said infrared light absorbing material and between said infrared light absorbing material and said infrared lamps.

8. The heating method according to claim 7 comprising the further step of placing a filter between said infrared lamps and said work piece.

9. The heating method according to claim 8 wherein said filter and said infrared transmitting material are of substantially the same composition.

10. A heating device comprising:
    a) a first infrared lamp having a first elongate filament and a first reflector with said first reflector having a segment removed therefrom to form a first reflector first edge;
    b) a second infrared lamp having a second elongate filament and a second reflector with a segment removed therefrom to form a second reflector first edge with said first edge of said first reflector and said first edge of said second reflector juxtaposed one to the next with said first elongate filament and said second elongate filament substantially parallel to a line passing through the centers of said lamps.

11. The heating device according to claim 10 with said second reflector having a second segment removed therefrom to form a second reflector second edge and further comprising a third infrared lamp having a third elongate filament and a third reflector with said third reflector having a third segment removed therefrom to form a third reflector first edge with said second reflector second edge and said third reflector first edge juxtaposed one to the next with said third elongate filament substantially parallel to a line passing through the centers of said lamps.

12. The heating device according to claim 10 wherein said first reflector first edge is joined to said second reflector first edge.

13. The heating device according to claim 11 wherein said first reflector first edge is joined to said second reflector first edge and said second reflector second edge is joined to said third reflector first edge.

14. The heating device according to claim 10 further comprising a frame for holding said infrared lamps.

15. The heating device according to claim 10 further comprising a filter placed between a work piece and at least one of said first and said second infrared lamps.

16. The heating device according to claim 10 wherein said first infrared lamp and said second infrared lamp are spot focused lamps.

17. The heating device according to claim 16 wherein said first infrared lamp and said second infrared lamp are positioned at a distance of about twice the focal length of said first infrared lamp without said segment removed and a distance of about twice the focal length of said second infrared lamp without said segment removed from a work piece.

18. A heating device comprising:
    a) a first infrared lamp having a first reflector with a first focal length and focusing to a first focal point with said first reflector having a segment removed therefrom to form a first reflector first edge;
    b) a second infrared lamp having a second reflector with a second focal length and focusing to a second focal point with a segment removed therefrom to form a second reflector first edge with said first reflector first edge and said second reflector first edge juxtaposed one to the next.

19. The heating device of claim 18 wherein said first infrared lamp and said second infrared lamp are positioned at a distance of about twice said focal length of said first infrared lamp and a distance of about twice said focal length of said second infrared lamp from a work piece.

20. The heating device of claim 18 with said first infrared lamp having a first elongate filament and said second infrared lamp having a second elongate filament with said first elongate filament and said second elongate filament being substantially parallel to a line passing through the centers of said lamps.

21. The heating device of claim 18 further comprising a filter placed between a work piece and at least one of said first and said second infrared lamps.

* * * * *